United States Patent [19]
Tierney et al.

[11] 3,810,181
[45] May 7, 1974

[54] LOW COST GUIDANCE RECEIVER

[75] Inventors: Peter R. Tierney, Briar Cliff Manor; Arthur F. Lohman, Pleasantville; Donald M. Andrus, Lincolndale, all of N.Y.

[73] Assignee: The Singer Company, Little Falls, N.J.

[22] Filed: Jan. 2, 1973

[21] Appl. No.: 320,376

[52] U.S. Cl............... 343/108 R, 325/63, 343/107, 343/179
[51] Int. Cl............................................. G01s 1/16
[58] Field of Search ........ 325/63, 55; 343/179, 107, 343/108, 108 M

[56] References Cited
UNITED STATES PATENTS
| | | | |
|---|---|---|---|
| 2,587,995 | 3/1952 | Griggs | 343/108 M |
| 3,401,389 | 9/1968 | Toman | 343/108 M |
| 3,426,279 | 2/1969 | Berman | 343/179 |

Primary Examiner—Maynard R. Wilbur
Assistant Examiner—Richard E. Berger
Attorney, Agent, or Firm—T. W. Kennedy

[57] ABSTRACT

A low cost airborne set for a microwave landing system in which a voltage controlled oscillator only accurate to within two channels is used for tuning. The oscillator, after selection of a desired channel on the control panel is scanned by a ramp voltage and, upon receiving a proper microwave signal, an AFC loop closed to hold the signal. The beams of the transmitter are switched at a variable rate to transmit a Morse Code identifying number which is decoded upon receipt and compared with the selected channel number. If a comparison results, the AFC remains in and the instruments are enabled. If the wrong station is being received, the AFC is removed and scanning resumed until the next signal is received and the process repeated until the proper channel is obtained.

18 Claims, 6 Drawing Figures

LOW COST GUIDANCE RECEIVER

BACKGROUND OF THE INVENTION

This invention relates to microwave landing systems in general and more particularly to a low-cost airborne receiver for such a landing system. In microwave landing systems signals are transmitted from a ground station at the runway to provide glide slope and localizer information to an aircraft so that the pilot of the aircraft by using his landing instruments may control the aircraft to follow a predetermined path toward the runway. One particular system developed by the Kearfott Division of the Singer Company is known as the Talar Microwave Landing System. The receiver described herein is primarily for use with that system, however, the principles may be applied to other similar systems.

The transmitted signal in the system comprises four beams which are sequentially switched. The beams are located in space so that there is an upper and a lower beam bracketing the proper glide slope angle and a right and left beam providing localizer information. The receiver in the aircraft by comparing the signal strength of the upper and lower and the right and left beams may determine whether the aircraft is above or below or to the right or the left of the desired path. Since a transmitter may be operating on more than one runway and since various transmitters may be operating in the same general area at different airports, it is necessary that different frequencies be assigned to the different transmitters. The landing system has an assigned frequency range and this frequency range is divided up into ten different bands. For example, the Talar system is assigned the KU band of 15.45 to 15.55 GHz. This band is then divided up into ten channels each separated by ten MHz. As mentioned above, the beams are provided sequentially. That is to say, that, for example, first the right beam, then the top beam, then the left beam, then the bottom beam might be provided. The beams are also switched at a variable rate in a manner such that the switching rate can be detected to provide a Morse Code identification of the airport. For example, in the New York area Kennedy Airport might be identified by the Morse Code letters JFK and LaGuardia by the letters LGA. This also permits distinguishing from other KU band signals such as weather radar.

Thus the receiver in the aircraft must be capable of tuning to a selected channel corresponding to the flight path (Azimuth and Glideslope) that the aircraft wants to follow in the landing. In general, in the prior art, this has been accomplished by providing a plurality of ten extremely stable oscillators in the receiver for use in selecting the desired channel and decoding the information from that channel. The stability of each oscillator should be less than a channel width which is three megahertz in the present TALAR. When all stabilities are considered in the ground station and the airborne set, the total allowable contribution of the local oscillator must be $\leq 1$ megahertz. Oscillators of the required accuracy and stability, however, are very expensive. For use in large military and commercial aircraft this is not a serious problem. However, if the system is to be applied to private aircraft a receiver that is within the budget limitations of the private pilot must be provided. This is an impossible task using the type of local oscillator provided in the prior art receivers. For example, a local oscillator meeting these requirements would have a cost in the range of $400 to $2,000. When this cost is added to the total cost of the receiver including all parts the price to the user becomes prohibitive. Thus, there is a need for a low-cost receiver which may be used by the private pilot.

SUMMARY OF THE INVENTION

The receiver of the present invention uses a low-cost local oscillator in a unique arrangement which permits providing the required accuracy at a low cost. The local oscillator is a voltage-controlled oscillator which is only accurate within plus of minus two channels. The operator selects the desired channel and the oscillator will output a frequency which is equivalent to that channel plus or minus two channel frequencies. At the transmitter a Morse Code Channel identifying number is transmitted before the letters identifying the airport. The received, demodulated and decoded output of the receiver is provided to comparison means which compare this channel number with a channel number provided when the channel is selected. A ramp generator causes the input voltage to the oscillator to be scanned until it is at a frequency equal to a received signal. At this point the number before the letters of that transmitted signal are decoded and compared with the selected number. If the selected number and the receive number are the same, the oscillator is held at that frequency by an automatic frequency control loop and the flight instruments enabled. If the received number is not the same as the selected number the system continues to scan until another signal is obtained and the comparison process is repeated as often as necessary until the right signal is obtained. At that point the automatic frequency control locks the oscillator onto this frequency and the output instruments are enabled for the pilot to fly the aircraft down the proper path.

DETAILED DESCRIPTION OF THE PREFERRED EMBODIMENT

Figure 1:
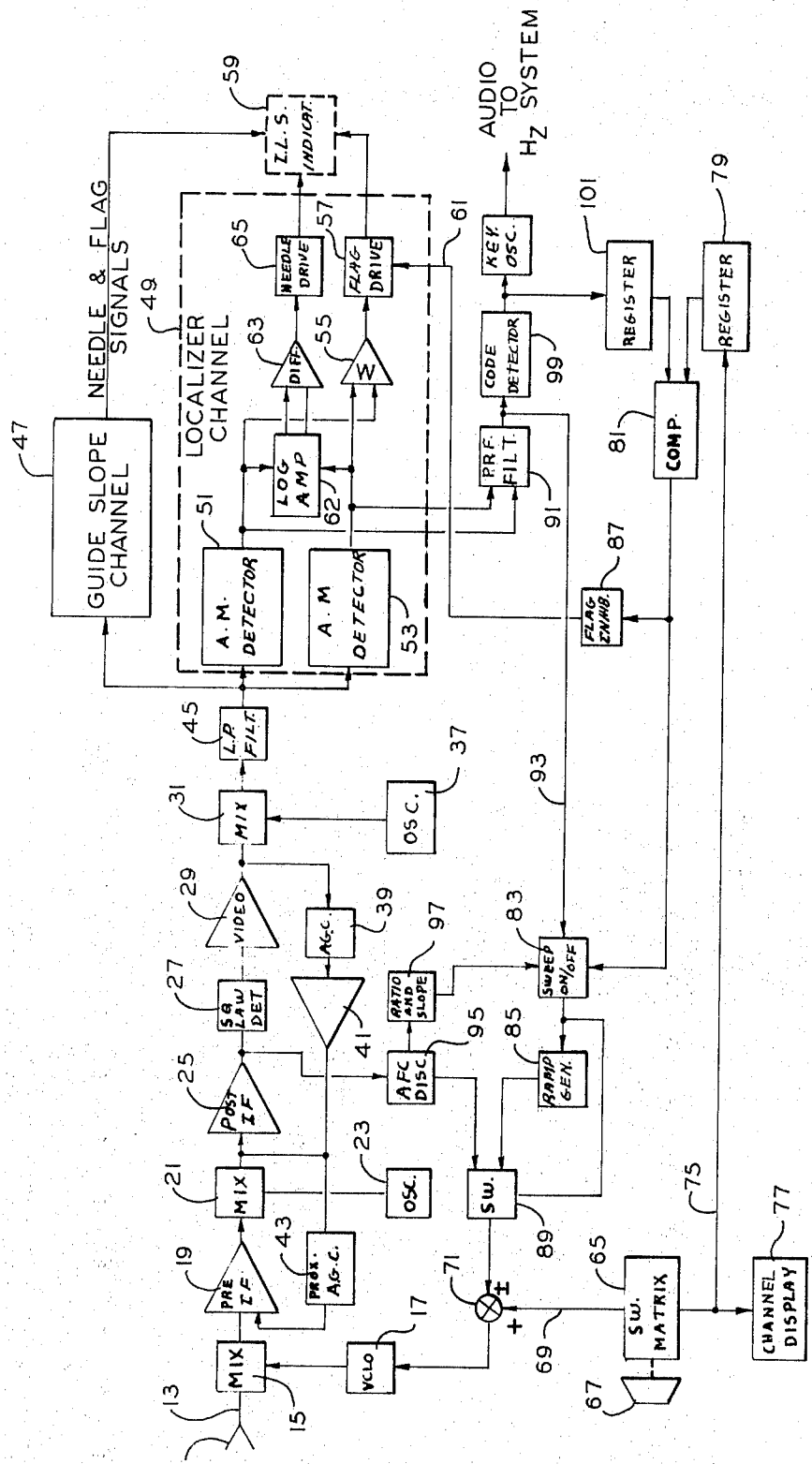
FIG. 1 is an overall block diagram of the system of the present invention.

The receiver of the present invention is identical to many well known super-hetrodyne microwave receivers used in landing and radar systems. Thus, the portions of the receiver using well known techniques will not be described in any more detail than is necessary to understand the invention. These portions of the circuit can be constructed by those skilled in the art by using these well-known techniques.

The signal is received by an antenna 11 and transmitted over a transmission line 13 to a mixer 15 where it is mixed with the output of the local voltage-controlled oscillator 17. Oscillator 17 will preferrably be a gunn oscillator which is voltage-controlled and has a stability within plus or minus 2 channels. The stability of the local oscillator could be as bad as 10 channels and the scheme would still function. However, the acquisition time would be long. However, reasonably priced devices (Gunn oscillators) are available with ± 2 channel stability. The output of the mixer 15 is provided to a pre IF amplifier 19 where it is amplified to increase the signal strength. The output from amplifier 19 is provided to another mixer 21 where the signal is mixed with an output from an oscillator 23 having an output frequency of 69 megahertz. (Frequencies used herein are used only as an example. Other frequencies may be used depending on the particular system design). The frequency input to pre IF amplifier 19 after mixing in mixer 15 will be approximately 90 megahertz. The pre IF amplifier 19 is designed to have a bandwidth of approximately 10 megahertz. In mixer 21 the IF frequency will then be reduced to 21 megahertz and will be provided to a post IF amplifier 25 having a bandpass of approximately 1 megahertz. The signal will then be detected by a square law detector 27 and provided to a video amplifier 29. The detected frequency will be approximately 200 kilocycles and the bandwidth of the video amplifier 29 approximately 25 kc.

Figure 2:
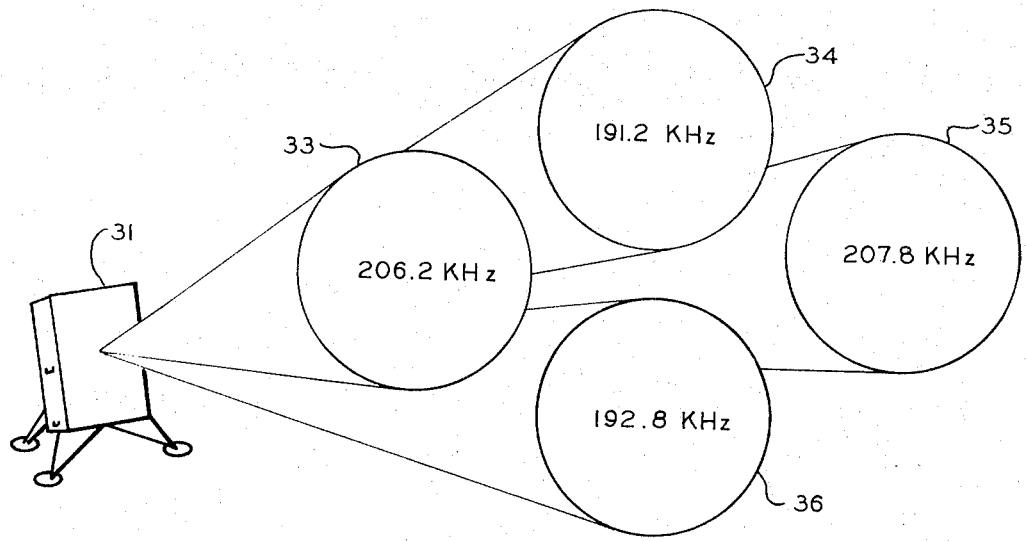
FIG. 2 is a perspective view illustrating the nature of the transmitted signals which are to be received by the receiver of the present invention.

At this point it might be well to look at the nature of the transmitted signal as shown on FIG. 2. The transmitter 39 transmits 4 beams 33 through 36 in sequence. Typical frequencies of the beams are shown in the figure. For example, beam 33, the right localizer beam, will have a frequency of 206.2 KHz. The upper glide slope beam 34 will have a frequency of 191.2 KHz. The left localizer beam 35 will have a frequency of 207.8 KHz and the lower glide slope beam 36 will have a frequency of 192.8 KHz. One of these will be the frequency at video amplifier 29. The output of amplifier 29 is provided to a mixer 31 where the signal is mixed with the output of an oscillator 33 having a frequency output of 188.4 KHz.

The output of amplifier 29 is also provided to an automatic gain control detector 39 from which the detected signal is provided through an amplifier 41 to control the gain of amplifier 25. The output of amplifier 41 is also provided to a proximity AGC circuit 43 which will control pre IF amplifier 19 when the aircraft is close to the runway threshold and the signal becomes extremely strong. The output of the mixer 31 which will be one of the frequencies shown on FIG. 2 minus the 188.4 KHz of oscillator 37 is passed through a low pass filter 45 to the localizer and glide slope channels. Only the localizer channel is shown in detail with the glide slope channel shown by block 47. This block will be a duplicate to the localizer channel enclosed in dotted lines 49. In each channel the signal is provided to two phase locked loop AM detectors 51 and 53. In the localizer channel shown, phase lock loop 51 would be adjusted to detect the frequency resulting when the 206.2 KHz signal was being received and phase lock loop 53 to detect the signal at 207.8 KHz. The manner of constructing such phase locked loops is described in an applications memo entitled General Description of the NE 560 B/NE 561 B Phase Locked Loops published by the Signetics Corporation of Sunnyvale, California.

The phase lock loops will output a signal which is proportional to the signal strength of the signal being detected. These signals are provided to a summing amplifier 55 which operates the flag drive 57 in the ILS indicator 59. The operation of the flag is such that when a channel is being received the flag will be moved out of the way, informing the pilot that he is locked on to the transmitted signal. An enabling input to be described below, on line 61 is also provided to flag drive 57.

The nature of the transmitted signals is such that signal strength due to deviation from the proper path will vary in a logrithmic fashion. Therefore, the outputs of detectors 51 and 53 are provided to a log amplifier having dual channels in which the antilog of the signal is found. The two outputs representing the strength of the right and left localizer signals respectively are differenced in a difference amplifier 63, and provided to the needle drive 65 which drives the localizer needle on the ILS indicator 59. If the two signals are equal, indicating that the aircraft is right between them and right on path, a zero output from amplifier 63 will result and the needle will not be deflected in either direction. However, of one signal is stronger than the other indicating deviation, the needle will be respectively deflected to provide an indication to the pilot that he is off the proper path.

The portion of the receiver thus far described is the same as that of a conventional Talar receiver. The only difference being that in the conventional receiver the oscillator 17 would be an oscillator stable within the limits of one channel. The remainder of the circuit, which will now be described, makes possible the use of a low-stability oscillator 17 in a receiver circuit such as this. The channel of the transmitter which it is desired to follow is selected by selecting one of the 10 channels in a switch matrix 65 via a control 67. This will cause a voltage to be output on line 69 to a summing point 71 from which it is provided to the oscillator 17 via line 73 to cause it to output a frequency which will be that of the selected channel plug or minus two channels. Another output of the switch matrix 65 in the form of a digital word representing the channel number in Morse Code will be provided on line 75 to the channel display 77 and to a register 79. The output of register 79 is provided to a code comparator 81 wherein the selected code is compared with the received code. Assuming that at this point acquisition has not yet occured, code comparator 81 will provide an output to a sweep on/off circuit 83 to activate a ramp sweep generator 85. It will also provide an output to a flag inhibit circuit 87 to prevent the flag from being immediately driven out when a signal is acquired. In response to an output from the sweep on and off circuit 83 a switch 89, preferably a FET switch will provide an additional input from ramp sweep generator 85 to the summing junction 71 to cause the frequency of the oscillator to sweep over the plus and minus two channel range.

The frequency will sweep in this manner until a signal output is detected from one or both of AM detectors 51 and 53. At this point an output will be provided to the beam switch pulse repetition frequency filter 91. Filter 91 will then provide an output on line 93 which will cause sweep on-off circuit 83 to provide an output to switch 89 to switch out the ramp and switch in an input from an automatic frequency control (AFC) discriminator 95. This output of sweep on/off circuit 83 will only be enabled by a proper output from the ratio and slope detector 97 indicating that the input waveform is being detected in the proper portion of the discriminator 95. The AFC will cause the voltage control oscillator 17 to lock onto this frequency while further processing is performed.

The output of filter 91 which will be an output at the switching frequency previously mentioned, i.e., it will contain the Morse Code information coded into the switching of the beams, is provided to a Morse Code detector 99. The output of Morse Code detector 91 is then gated into a received code storage register 101 which provides the second input to code comparator 81. If the received code in register 101 is not the same as the stored code in register 79 an output from code comparator 81 will cause the sweep to start up again by causing sweep on/off circuit 83 to provide an output to switch 89. The oscillator will be swept until the next frequency is detected and at that point another comparison will be made. This process will continue until the received code and the stored code are the same. At that point an output from code comparator 81 will cause switch 89 to remain switched to the AFC and will cause the flag inhibit to be removed. The flag will drop out and the pilot may then start observing the instruments knowing he is on the right channel frequency.

Figure 3:
FIG. 3 is a pulse diagram illustrating the manner in which the transmitted signals are coded.
Figure 3:

FIG. 3 illustrates how the Morse Code is transmitted by varying the beam repetition rate. When there is no character being transmitted the beam repetition rate will be 134 Hz for example. When it is desired to transmit a character the rate will be changed to 115 Hz. To transmit a dot the 115 Hz signal will be maintained for ½ second, for example. To transmit a dash the 115 Hz signal will be maintained for 1½ seconds. Between dots and dashes in any given letter or number being transmitted a space of ½ second, at which time transmission is done at the 134 Hz rate, is inserted. Between characters the space will be longer; for example, it might be in the order of one and a half or two seconds. As previously mentioned, the prior art system transmits three identifying letters identifying the airport which is transmitting. For use with the present receiver a number identifying the channel being transmitted is added in front of the three letters. These are transmitted in a group. For example, 1JFK. Between the groups of letters will be an even longer space during which switching will be at the 134 Hz rate.

Figure 4:
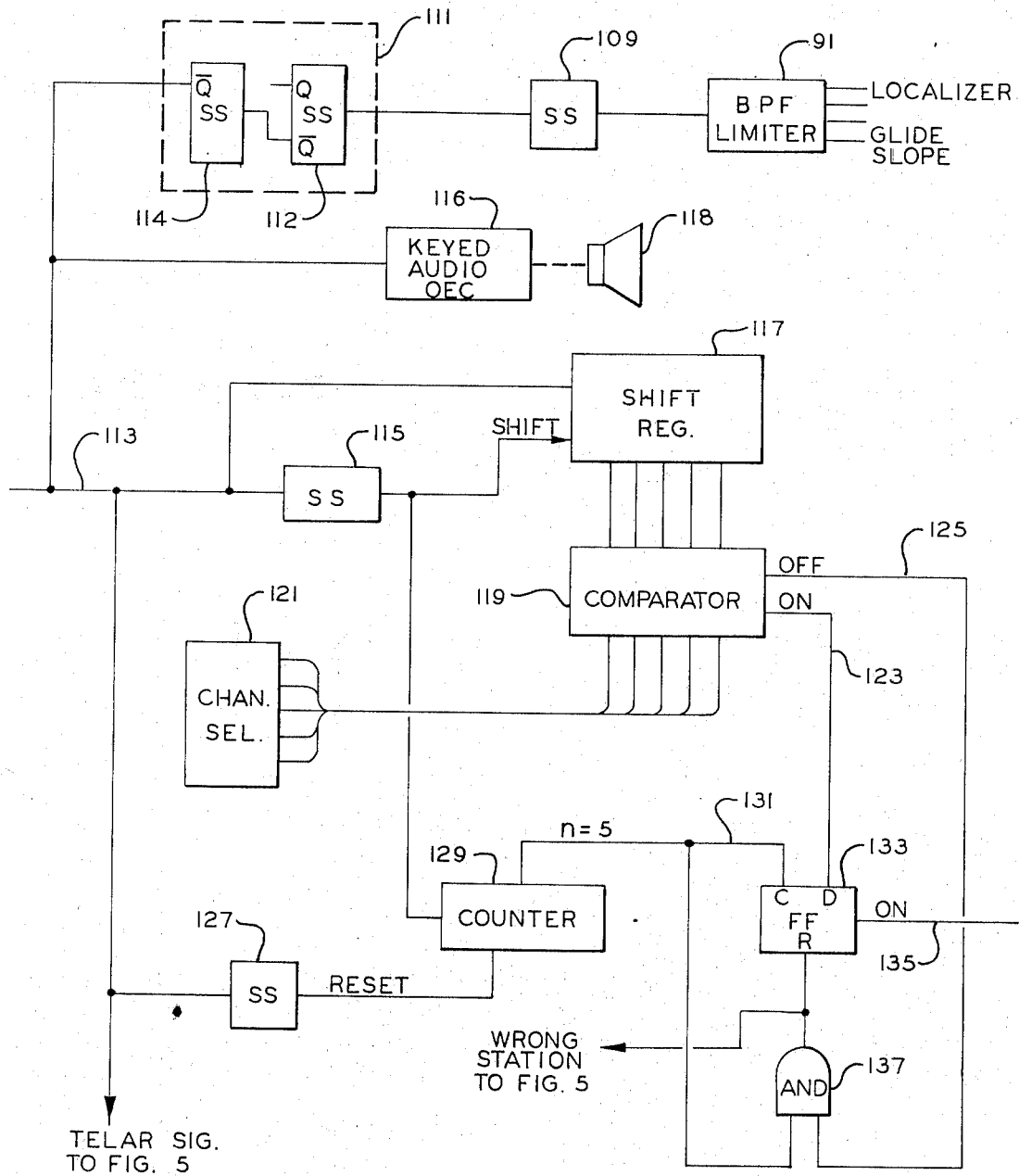
FIG. 4 is a block diagram illustrating the portion of the present invention used for station determination.
Figure 4A:
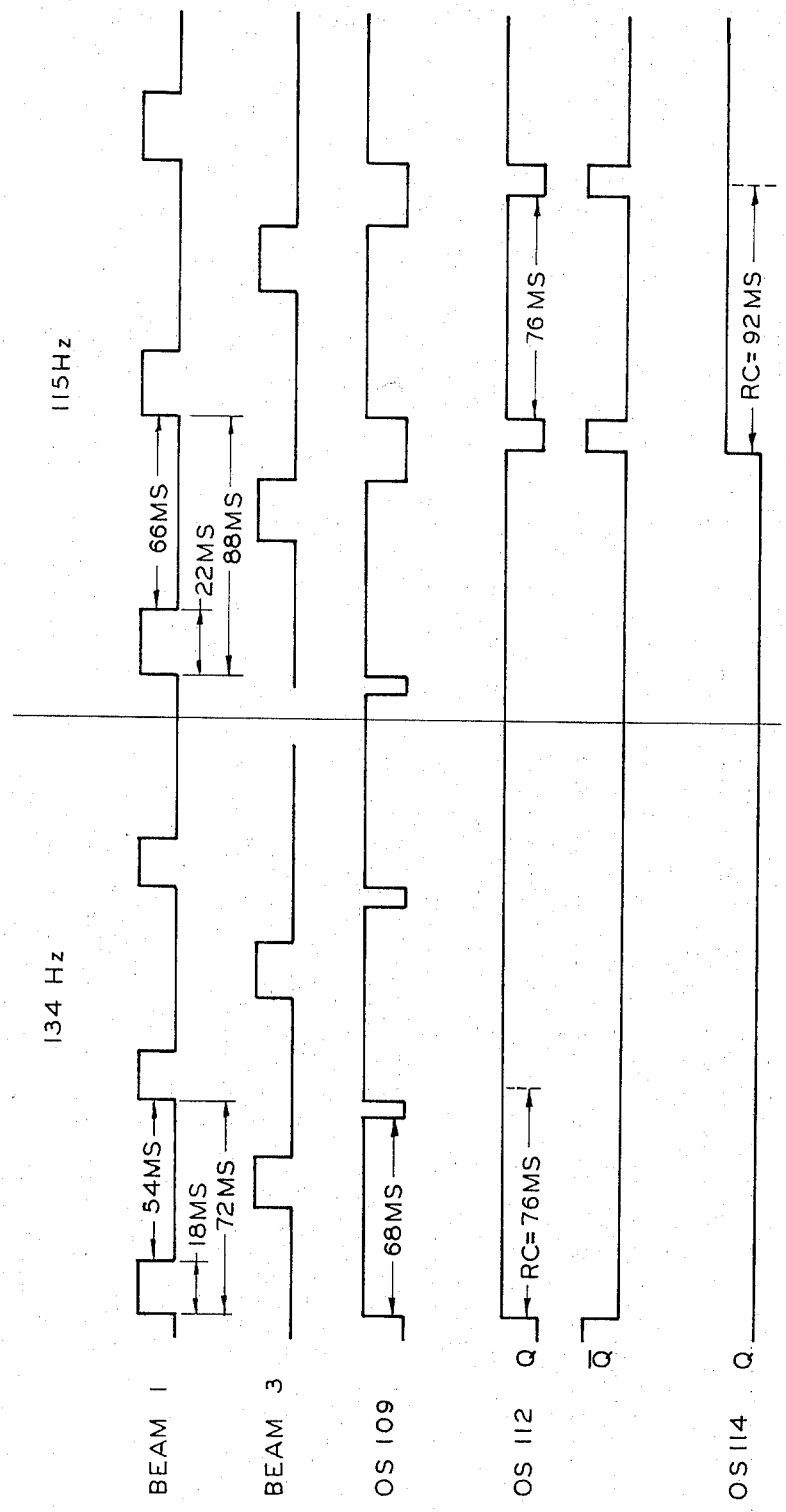
FIG. 4a is a waveform diagram illustrating various signals present in the portion of the system illustrated by FIG. 4.

As shown on FIG. 4, the outputs of the phase lock demodulators are provided into the bandpass filter limiter 91 where they are filtered and the pulses shaped. Since either or both of the signals from the phase lock loop demodulators may be present, the output the the limiter is first passed through a one-shot multi-vibrator so that only the first of the signals will be used where more than one is present. This may be more clearly seen from an examination of FIG. 4-A. The two localizers beams labeled, for example Beam 1 and Beam 3 are shown by the first two waveforms on the figure. As previously described, the four beams are transmitted in sequence at two different rates, a 134 Hertz rate to indicate a space and a 115 Hertz rate to indicate a character. Thus, Beam 1 will be on for approximately 18 milliseconds and off for 54 milliseconds when trasmitting at the 134 Hertz rate. Similarly it will be on for 22 milliseconds and off for 66 milliseconds when transmitting at the 115 Hertz rate. (The numbers are approximate and are used just for this example.) At the time when Beam 1 is switched off, Beam 2 (not shown) would be switched on for 18 milliseconds. When Beam 2 is switched off, Beam 3 which is shown will be switched on for 18 milliseconds. At the end of Beam 3, Beam 4 (not shown) would be switched on for 18 milliseconds. Since any one or all of these beams may be provided as an output from the filter 91, it is necessary that only the first one to be received be recognized. Thus, one shot 109, the output of which is shown by the third waveform, will be arranged to have a time constant of, for example, 68 milliseconds. In this way it will be triggered by Beam 1, assuming that is the first beam to be received and will not be affected by Beams 2, 3 or 4 since it will remain on until after the leading edges of those beams. This will be true at both the 134 and 115 Hertz rates since the maximum time between two leading edges in the 134 Hertz rate, for example, between Beam 1 and Beam 4 will be 54 milliseconds and the maximum time between the leading edges of pulses at the 115 Hertz rate will be 66 milliseconds. In this manner only one of the four beam signals will trigger one shot 109 and the output thereof will reflect the rate being transmitted i.e., either 134 Hertz or 115 Hertz as shown on FIG. 4A. The output of one shot 109 is provided to a Morse Code demodulator 111, comprising single short 112 and 114, which will provide an output which is high when the beam repetition rate is at 115 Hz and low when the beam repetition rate is at 134 Hz, as shown on FIG. 3.

The output of single show 109 is provided as the triggering input to a single shot 112 which is a retriggerable single shot. One shot 112 will have a time constant of, for example, 76 milliseconds. It will be noted that this time constant is longer than the time between two pulses at the 134 Hertz rate but shorter than the time between two pulses at the 115 Hertz rate. The nature of a retriggerable one shot is that if it receives a second pulse before the end of its time period it will remain in the state to which it was triggered. Thus, an examination of the waveform for one shot 112 shows that at the time the one shot is ready to return to its low state, after 76 milliseconds, it will have received another pulse from one shot 109 and remain high. As long as the input pulse is at 134 Hertz the Q output will remain high and the Q not output will remain low. However, if the rate switches to 115 Hertz the one shot 112 will return to its other state before the next pulse comes along and will then be triggered by this pulse when it does occur. Thus, the output of one shot 112 will be at a constant level when the 134 Hertz signal is received and will output a pulse train at a frequency of 115 Hertz in response to that input as shown by the Figure. The Q not output of one shot 112 is provided as the triggering input to a second retriggerable one shot 114. This one shot will have a time constant of, for example, 92 milliseconds. When 134 Hertz is being received the Q not output from one shot 112 will remain low and the Q output of 114 will stay in its low state. However, when the 115 Hertz signal is received, it will be passed by the one shot 112 and will trigger the one shot 114. Since the time constant of one shot 114 is longer than the time between the 115 Hertz pulses, once triggered it will remain in its high state until pulses are no longer being received at its input i.e., when the frequency changes to 134 Hertz and the Q not output of one shot 112 goes to zero and stays there. Thus, the output of one shot 114 will remain at zero as long as 134 Hertz signal is being transmitted and will go to a high state for as long as the 115 Hertz signal is being transmitted as shown on FIG. 3.

The output of block 111 from single shot 114 is provided as an input on line 13 to a single shot 115 and a shift register 117. The single shot 115 will output a standard pulse in response to the rising edge of each input pulse on line 113 as shown on FIG. 3. This standard pulse will have a length which is about one and a half times the duration of a dot pulse as shown on the figure. The shift register 117 is responsive to the transition from a high to a low level to cause a data to be input and shifted in the shift register. Therefore, if a dot has been transmitted, at the occurrence of the transition of the standard pulse from single shot 115 there will be a zero level at the input to shift register 117 and this will be loaded into the shift register. On the other hand, if a dash is being transmitted, the signal on line 113 will still be high when the pulse from single shot 115 goes low and a high level or 1 will be loaded into the shift register 117. Thus, the shift register after the 5 bits representing the number are loaded into it, will have 0's representing dots and 1's representing dashes.

It will be noted at this time that in the Morse Code a number is always represented by 5 characters and a letter is never represented by 5 characters. The present system makes use of this fact as will be seen in more detail below. The outputs of shift register 117 are provided as a first set of inputs to a comparator 119. The second set of inputs are provided by the channel selection matrix 121. As described above, channel selection matrix will output a digital word comprised of the proper arrangements of dots or dashes to represent the selected channel. Comparator 119 will compare the selected word with the output of shift register 117. If they are the same an output will be provided on line 123. If different, an output qill be provided on line 125. To avoid the possibility that information from two letters being transmitted are loaded into shift register 117 and a comparison is reached in comparator 119 in response thereto, a second single shot 127 and counter 129 are provided. Single shot 127 is a retriggerable single shot. It will be set by the first code pulse and will remain set as long as the pulses are occurring in rapid succession, i.e., there is no word space or group space between pulses. As long as there is an output from single shot 127 the pulses out of single shot 115 will be counted in counter 129. If the incoming pulses represent a letter, than a space will be encountered before a count of 5 is reached in counter 129. When a space is reached single shot 127 will go to its other state and reset counter 129. However, if the input data represents a number, than 5 input pulses will be received before single shot 127 goes to its other state. When counter 129 reaches the count of 5 it will provide an output on line 131. If the comparator 119 has made a comparison finding the number and shift register 117 equal to the selected channel it will have an output on line 23. The output on line 131 will clock this into flip flop 133, setting it and causing it to provide an On indication output on line 135 which is provided to the sweep on/off circuitry to be described below. If, however, the output of comparator 119 is on line 125 indicating inequality, this output along with the output of counter 129 will be Anded in a gate 137 and will reset flip-flop 133. This insures that if the proper station has once been acquired and is then lost the indicator will be disabled and a new search will be instituted.

Also shown on FIG. 4 is a keyed audio oscillator 116 and a speaker 118. The output of Morse Code demodulator 111 is used to key the audio oscillator which provides its output to the speaker 118. Thus, the pilot is given an aural indication of the code being received. In this regard it should be noted that a simplified system may be constructed in which the ramp generator is replaced by a variable voltage control controlled by the pilot. In that case the pilot after selecting his channel initially can tune the range of the local oscillator until he obtains a signal. He can then listen to the Morse Code output and determine if he has or has not obtained the correct signal. He can continue his tuning until he does obtain the proper signal and then begin using his instruments. The audio Morse Code in the present system with the automatic tuning also gives the pilot an audio check to make sure that nothing has happened in the automatic selection of the station being presented on the instruments.

Figure 5:
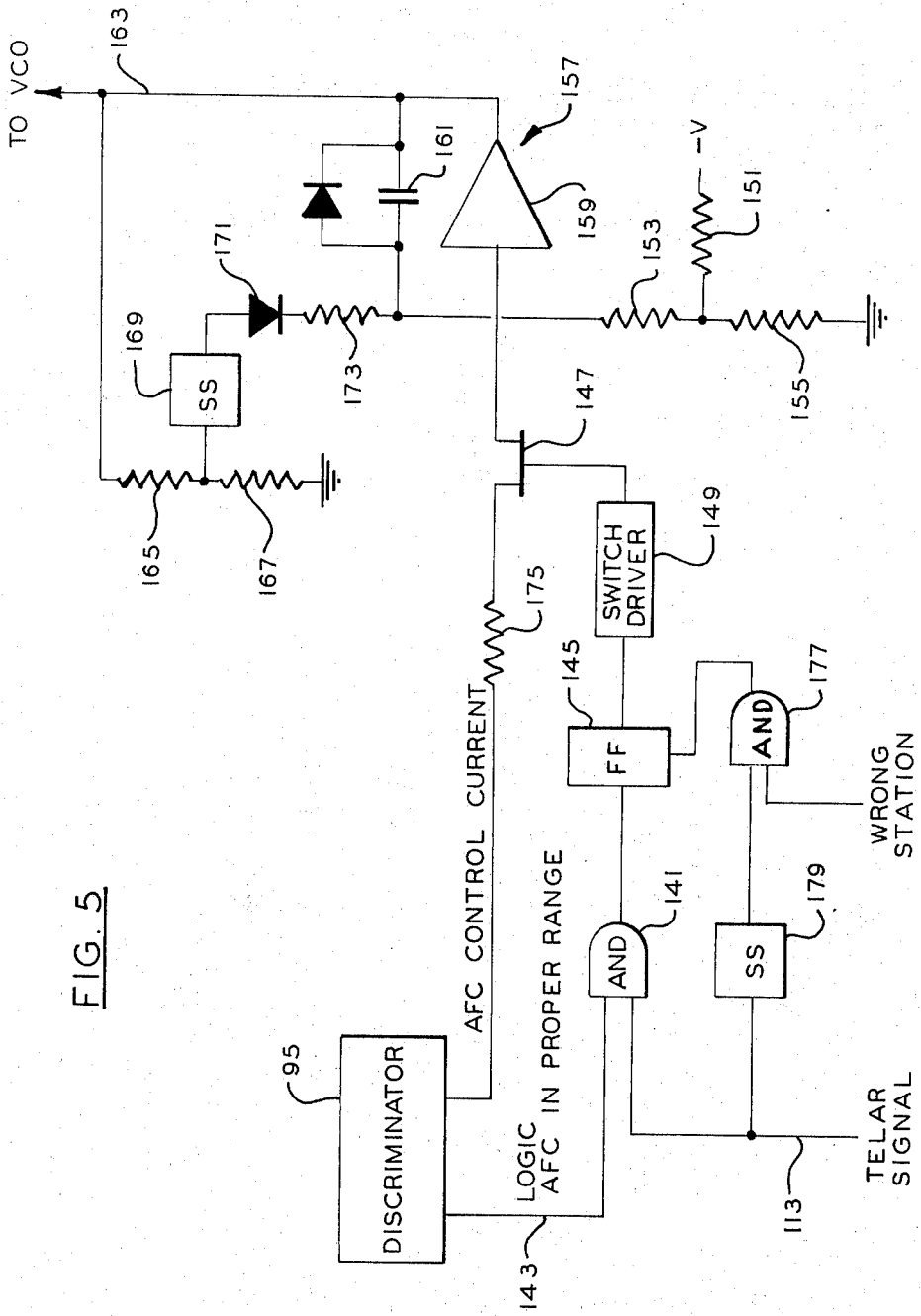
FIG. 5 illustrates the ramp sweep generator and associated logic and switching functions of the system of FIG. 1.

The ramp sweep generator and its associated logic and switching of FIG. 1 which provide the required sweeping of the frequencies is shown on FIG. 5. When any Talar signal is detected by the AM detectors 51 and 53 of FIG. 1 and is passed through the bandpass filter 91 shown on FIGS. 1 and 4 thence through single shot 109 and demodulator 111 of FIG. 4, a signal will appear on line 113. As described above, these will be a series of pulses indicating dots and dashes. The signal on line 113 is provided as in input to an AND gate 141 shown on FIG. 5. The second input to this AND gate is provided by the AFC discriminator 95. AFC discriminator 95 may be what is known as a Weiss discriminator or the type of circuit known as a Sealy-Foster discriminator, both of which are well-known in the art. The AFC discriminator 95 outputs to a ratio and slope detection circuit, whose function is to determine that the center frequency of the swept signal is located within the linear section of the loop and is not locked onto the negative peak preceeding the linear section. The output on line 143 will be a logic output indicating that the discriminator is operating in the proper range. If both the Talar signal on line 113 and the logic signal on 143 are present, AND gate 141 will provide an output to set a flip-flop 145. This flip-flop is used to control a field effect transistor 147. Interposed between the flip-flop 145 and transistor 147 is a switch driver 149 to provide a shift in level to properly drive the transistor 147. This may be simple transistor driver circuit of the type well-known in the art.

With switch 147 opened, i.e., no input from 145, a negative voltage through a resistor 151 to a voltage divider comprising resistors 153 and 155 provides an input to an integrator 157 comprising amplifier 159 and capacitor 161 in its feedback loop. The negative voltage is inverted by the amplifier 159 and the output integrated to provide an output which is in the form of a positive ramp. This output is provided on line 163 to the voltage-controlled oscillator 17 of FIG. 1. The output is also provided to a resistor divider comprising resistors 165 and 167. The center point of these resistors is the input to a single shot 169. The single shot 169 will respond to a voltage exceeding a predetermined level to output a pulse of a duration determined by the time constant of the single shot. This output is provided as an input through a diode 171 and resistor 173 to the amplifier 159. The resistor 173 will be of a much lower value than resistor 153 and a positive pulse output from single shot 169 will result in a negative output from amplifier 159 which will quickly drive the integrator back to zero. The time constant of single shot 169 is adjusted to provide a pulse which is just long enough to cause the integrator output to reset to zero. Thus, until a signal is encountered the integrator 157 with its reset circuit will generate a ramp. When the signal is encountered and flip flop 145 is set turning on transistor 147 the amplifier 159 will now have as an input, through the transistor, the output of discriminator 95. This input is provided through a resistor 175 having a value much lower than that of resistor 153. Thus, the main contribution to the input of the amplifier 159 will be from the discriminator 95. As the small contribution from the negative voltage source through resistor 153 tends to cause the output to increase, the discriminator will shift in frequency and will provide an opposite voltage to hold the output at the proper point. Thus, the integrator 157 will hold the proper voltage to maintain the desired frequency. Any deviation from that frequency will be sensed by discriminator 95 and a proper signal provided to amplifier 159 to restore the system to the proper frequency.

As is evident from the discussion above in connection with FIG. 4 and the previous figures, the system will sometimes stop at the wrong channel. In that case, as shown on FIG. 4, after counter 129 has reached a count of 5 an input will be provided out of gate 137 which will reset the flip-flop 133. This signal which can be designated "the wrong station signal" is also provided as an input to an AND gate 177 on FIG. 5. When the Talar signal was first detected the pulse on line 113 caused single shot 179 to fire. Single shot 179 will have an output which normally enables gate 177. However, when the single shot fires it will go to a level which will disable gate 177. It's time constant is set so that this disabling period lasts for a time sufficient to make a comparison of the input signal. Thus, a wrong station signal which occurs before a complete comparison can be made will not be recognized. After single shot 179 has permitted sufficient time for the received signal to be checked in the logic of FIG. 4 it will again enable AND gate 177 at which point, if a wrong station signal is present, flip-flop 145 will be reset thereby causing integrator 157 to begin integrating again and continue scanning until the next station is found.

The scanning thus continues until a station is locked onto which does not result in a wrong-station output. At this point the system will remain locked on to the channel then being received which will be the proper channel. If at any time the signal is lost, a wrong station signal into AND gate 177 will reset flip-flip 145, to cause scanning to again commence.

Thus, a low-cost microwave landing system receiver in which a comparison is made between a selected and a transmitted channel number to control a local voltage-controlled oscillator has been shown. Although a specific embodiment has been illustrated and described, it will be obvious to those skilled in the art that various modifications may be made without departing from the spirit of the invention which is intended to be limited solely by the appended claims.

We claim:

1. In a microwave landing system of the type wherein a plurality of beams are transmitted in sequence to define a path to be followed when landing an aircraft, the switching rate of said beams being varied to transmit at least one coded character identifying which of several possible channels is being transmitted and wherein there is provided an airborne receiver comprising at least means to process the received beams to provide a localizer and a glide slope output signal, said receiver including a local microwave oscillator which is tuneable to one of several channels, apparatus to permit using a low accuracy voltage controlled oscillator in the receiver comprising:
   a. channel selection means providing as outputs a first voltage which will tune the local oscillator to within a predetermined number of channels from the selected channel and a digital word indicative of the channel selected;
   b. a ramp sweep generator providing an output which will sweep over a range of voltages representing plus and minus said predetermined number of channels;
   c. means to sum the output of said sweep generator and said first voltage and to provide said sum as a control input to oscillator;
   d. means to detect the presence of any one of the localizer and glide slope outputs in said receiver, and to provide an output indicative thereof;
   e. automatic frequency control (AFC) means;
   f. means responsive to said detector output to cause the voltage output at said sweep generator to be held and to be controlled by said automatic frequency control means;
   g. means to decode and store in digital form the identifying character in said transmitted signal; and
   h. means having said decoder output and said digital word as inputs to compare said decoder output with said digital word and to provide one output if the two inputs are the same and another output if the two inputs are different;
   i. said means responsive to the detector output being responsive to said another output to cause said sweep generator to resume scanning.

2. The invention according to claim 1 wherein said predetermined number of channels is two.

3. The invention according to claim 1 wherein said at least one coded character includes a number coded in Morse Code identifying the channel being transmitted.

4. The invention according to claim 3 wherein a space is transmitted at a first frequency and a dot or dash at another frequency and said means to decode comprise:
   a. means to detect said second frequency and provide an output when said frequency is being received;
   b. a shift register; and
   c. means to load into said shift register a one when said frequency lasts for a time period representing a dash and a zero when said frequency lasts for a time period representing a dot.

5. The invention according to claim 4 wherein said first frequency is higher than said second frequency and said means to detect said second frequency comprises:
   a. a first retriggerable one shot having the received signal as an input and having a time constant longer than the time between pulses at said first frequency but shorter than the time between pulses at said second frequency whereby said one shot will have an inverted output which will be at zero when said first frequency is input and an output at said second frequency when said second frequency is input; and b. a second retriggerable one shot having the inverted output of said first one shot as an input and having a time constant longer than the time between pulses at said second frequency whereby the output of said one shot will be high in response to said second frequency being input and zero in response to the zero input resulting from said first frequency being input to said first one shot.

6. The invention according to claim 5 wherein the localizer and glide slope signals provided in said receiver comprise a first pair of localizer and a second pair of glide signals and further including:

a. a band pass filter limiter having said first and second pairs of signals as inputs and providing an output containing any and all signals present at its input; and b. a third one shot having a time constant slightly less than the time between two pulses on any one of said input signals at said first frequency having the output of said limiter as an input and providing its output to said detecting means whereby, when more than one of said signals is present, only the first signal to be received will trigger said one shot thereby providing an output at the proper frequency.

7. The invention according to claim 4 and further including a keyed audio oscillator and a speaker, said oscillator being keyed by said detector output and providing its output to said speaker thereby providing an aural indication of the received code.

8. The invention according to claim 4 wherein said means to load comprises a first single shot multivibrator having an output pulse of a length less than the length of a dash but greater than a length of a dot, the trailing edge of said pulse being provided as a shift input to said shift register, the output of said means to detect providing its leading edge as a triggering input to said single shot and said pulse being a data input to said register.

9. The invention according to claim 4 wherein said code further includes a plurality of letters in addition to said number, a space larger than the space between dots and dashes in each letter being transmitted between each of said number and letters and further including means to detect a number and to enable said comparator output only in response to a decoded number being loaded into said shift register.

10. The invention according to claim 9 wherein said detecting and enabling means comprise:

a. a module 5 counter providing an output each time its count reaches five;

b. a second single shot having the output of said frequency detector as an input and providing an output at a first level for as long as the space between inputs does not exceed the space between dots and dashes and providing said output to the reset input of said counter, said counter being responsive to reset upon the change of said single shot output from said first level to a second level when a longer space occurs;

c. a flip-flop;

d. means to set said flip-flop in response to the simultaneous presence of said comparator one output and said counter output and to reset said counter in response to said comparator another output and said counter output whereby said one output will be transferred to said flip-flop set output only when said counter reaches a count of five in response to a number being received.

11. The invention according to claim 1 wherein said ramp sweep generator and said responsive means comprise:

a. an integrator having an input and an output and providing said output to said summing means;

b. means to reset said integrator whenever said output exceeds a pre-determined valve;

c. a first resistor coupling the input of said integrator to a referenced voltage, said resistor selected to provide a first time constant in said integrator;

d. a switch coupling said integrator input through a second resistor to the output of said automatic frequency control circuit, said second resistor selector to provide a second time constant in said integrator at least an order of magnitude shorter than said first time constant; and e. means to close said switch in response to an output from said detecting means and to open said switch in response to said another output from said comparator.

12. The invention according to claim 11 wherein said means to reset said integrator comprises a single shot having the output of said integrator as an input and adjusted to trigger at said pre-determined level and providing its output at a polarity opposite that of said reference through a third resistor to the input of said integrator, the length of said pulse being such that, for the time constant of said integrator through said third resistor, it will provide said output for a time sufficient to cause said integrator to integrate to its reset point.

13. The invention according to claim 11 wherein said means to close said switch comprise:

a. a flip-flop providing its set output to close said switch;

b. means to set said flip-flop in response to the output of said detector means indicative of a received signal; and c. means to reset said flip-flop in response to said comparator another output.

14. The invention according to claim 13 wherein said AFC control means provides a signal output which is provided to said switch and further provides a logic output indicating it is operating in the proper range and further including means to enable said detector means only when said logic output is present.

15. The invention according to claim 14 wherein said enabling means comprise an AND gate having said logic output and said detector output as inputs and providing its output to set said flip-flop and further including a one shot having a trigger input responsive to said detector output, a second AND gate having the inverted output of said one shot and said another output as inputs an providing its output to reset said flip flop, said one shot having a time constant longer than the time to make a comparison whereby said flip-flop cannot be reset during the period when a comparison is being made.

16. In a switched beam microwave landing system, a method of transmitting and decoding signals so that a low accuracy local oscillator may be used in the receiver comprising:

a. switching the transmitted beams such that the switching rate transmits a Morse Code identifying group of characters identifying the microwave channel;
b. providing a low accuracy voltage controlled oscillator (VCO) in the microwave receiver;
c. providing a nominal input voltage to said VCO corresponding to a desired channel;
d. developing a ramp scan voltage having a range corresponding to plus and minus the oscillator accuracy and adding said ramp voltage to said nominal voltage;
e. detecting the presence of any received channel;
f. closing an automatic frequency control (AFC) loop in response to detecting a channel;
g. decoding and storing the transmitted Morse Code channel number;
h. comparing said stored number with the desired channel number; and
i. maintaining said AFC loop closed when said two numbers are the same and opening said loop to resume scanning when said two numbers are not the same.

17. The invention according to claim 16 wherein the Morse Code group of characters includes a number and a plurality of letters and further including the steps of:

a. transmitting a space between each of said letters and said number greater than the space between characters in a letter and number;
b. detecting said space to detect the beginning of each letter and number;
c. counting the number of characters in each number and letter,
d. perform the step of comparing only when the number of characters ie equal to five.

18. The invention according to claim 17 wherein said oscillator is accurate to two channels and said ramp voltages scans a range of plus and minus two channels.

* * * * *